US010585879B2

(12) United States Patent
Dunne et al.

(10) Patent No.: US 10,585,879 B2
(45) Date of Patent: *Mar. 10, 2020

(54) DATABASE IDENTIFIER GENERATION IN TRANSACTION PROCESSING SYSTEMS

(71) Applicant: International Business Machines Corporation, Armonk, NY (US)

(72) Inventors: Sean K. Dunne, Dublin (IE); Martin A. Flint, Dublin (IE); Liam S. Harpur, Dublin (IE); Peter McGrath, Meath (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,455

(22) Filed: Nov. 21, 2018

(65) Prior Publication Data

US 2019/0087451 A1 Mar. 21, 2019

Related U.S. Application Data

(63) Continuation of application No. 14/620,483, filed on Feb. 12, 2015, now Pat. No. 10,169,395.

(51) Int. Cl.
*G06F 16/00* (2019.01)
*G06F 16/23* (2019.01)
(Continued)

(52) U.S. Cl.
CPC .......... *G06F 16/2365* (2019.01); *G06F 16/21* (2019.01); *G06F 16/2282* (2019.01); *G06F 16/2379* (2019.01)

(58) Field of Classification Search
CPC .. G06F 16/2365; G06F 16/21; G06F 16/2379; G06F 16/2282
(Continued)

(56) References Cited

U.S. PATENT DOCUMENTS 5,530,837 A 6/1996 Williams
5,901,214 A 5/1999 Shaffer
(Continued)

FOREIGN PATENT DOCUMENTS

JP 2014512741 A 5/2014
WO 2014077807 A1 5/2014

OTHER PUBLICATIONS

Dunne et al., "Database Identifier Generation in Transaction Processing Systems", U.S. Appl. No. 16/197,500, filed Nov. 21, 2018, pp. 1-25.
(Continued)

*Primary Examiner* — Thanh-Ha Dang
(74) *Attorney, Agent, or Firm* — Isaac J. Gooshaw

(57) ABSTRACT

One or more processors initiate generation of an identifier based on the definitions of both a primary range and a secondary range. One or more processors obtain a unique sequence value from a unique sequence range of known maximum number of values. One or more processors determine an offset value based on, at least in part, the primary range and the secondary range. One or more processors add the offset value to the unique sequence value to generate an identifier value. Processing a transaction using the identifier value as a database primary key in a database of a transaction processing system.

20 Claims, 6 Drawing Sheets

(51) Int. Cl.
*G06F 16/21* (2019.01)
*G06F 16/22* (2019.01)

(58) Field of Classification Search
USPC .......................................................... 707/602
See application file for complete search history.

(56) References Cited

U.S. PATENT DOCUMENTS

| | | | |
|---|---|---|---|
| 5,933,820 A * | 8/1999 | Beier | .................. G06F 16/2282 |
| 7,725,471 B2 | 5/2010 | Weinberg | |
| 7,756,889 B2 | 7/2010 | Yu | |
| 7,870,110 B2 | 1/2011 | Olivieri | |
| 8,250,627 B2 | 8/2012 | Exton | |
| 8,489,553 B2 | 7/2013 | Kulkarni | |
| 9,471,657 B1 | 10/2016 | Xiao | |
| 9,740,724 B2 | 8/2017 | An | |
| 9,740,762 B2 | 8/2017 | Horowitz | |
| 2003/0229610 A1 | 12/2003 | Van Treeck | |
| 2004/0236743 A1* | 11/2004 | Blaicher | ............. G06F 16/2282 |
| 2004/0267782 A1 | 12/2004 | Nakano | |
| 2005/0251524 A1 | 11/2005 | Shukla | |
| 2007/0271211 A1 | 11/2007 | Butcher | |
| 2008/0201296 A1 | 8/2008 | Yu | |
| 2008/0228802 A1* | 9/2008 | Marshall | ............. G06F 16/2282 |
| 2009/0198736 A1* | 8/2009 | Shen | .................. G06F 16/2282 |
| 2010/0030800 A1* | 2/2010 | Brodfuehrer | ....... G06F 16/2282 |
| | | | 707/803 |
| 2010/0106934 A1 | 4/2010 | Calder | |
| 2011/0145239 A1 | 6/2011 | Newman | |
| 2012/0011340 A1 | 1/2012 | Flynn | |
| 2012/0254175 A1* | 10/2012 | Horowitz | .............. G06F 16/278 |
| | | | 707/737 |
| 2012/0284235 A1 | 11/2012 | Swett | |
| 2013/0290249 A1 | 10/2013 | Merriman | |
| 2015/0310051 A1 | 10/2015 | An | |
| 2016/0026667 A1 | 1/2016 | Mukherjee | |
| 2016/0239522 A1 | 8/2016 | Dunne | |
| 2016/0239530 A1 | 8/2016 | Dunne | |
| 2017/0322996 A1 | 11/2017 | Horowitz | |
| 2018/0210914 A1 | 7/2018 | Huang | |

OTHER PUBLICATIONS

IBM Appendix P., "List of IBM Patents or Patent Applications to be Related", Dated Nov. 21, 2018, 2 pages.

IBM, "Automatically Generating Sequences of Numeric Values in DB2 Universal Database", IBM, Feb. 27, 2003, pp. 1-10, <http://www.ibm.com/developerworks/data/library/techarticle/0302fielding/0302fielding.html>.

Smith, Benji, "Server Generated Keys: Unique IDs for Distributed Databases", Dashboard. Orchestrate, (/blog/2014/06/23/server-generated-keys-unique-ids-for-distributed-databases/), Jun. 23, 2014, Copyright Orchestrate, Inc . . . , 5 pages.

* cited by examiner

DATABASE IDENTIFIER GENERATION IN TRANSACTION PROCESSING SYSTEMS

FIELD OF INVENTION

This invention relates to the field of database identifier (ID) generation in transaction processing systems. In particular, the invention relates to database ID generation in transaction processing systems with high transaction rates.

BACKGROUND

High transaction systems, such as financial transaction systems, often require generation of unique IDs for database primary keys. Historically, these have been generated by direct access to database sequences.

BRIEF SUMMARY OF THE INVENTION

According to a first aspect of the present invention there is provided a method for processing a transaction, comprising: obtaining, by one or more computer processors, a unique sequence value from a unique sequence range of known maximum number of values; determining, by the one or more computer processors, a first product by multiplying a value included in a primary range and a maximum number of values in a secondary range; generating, by the one or more computer processors, a first total by adding the first product to a value included in the secondary range; determining, by the one or more computer processors, an offset value by multiplying the first total by the maximum number of values in the unique sequence range; generating, by the one or more computer processors, an identifier value for a database by adding the offset value to a unique sequence value; and processing, by the one or more computer processors, a transaction of a plurality of transactions by using the identifier value as a database primary key in a database of a transaction processing system.

According to a second aspect of the present invention there is provided a system for processing a transaction, comprising: one or more computer processors; one or more computer readable storage medium; and program instructions stored on the computer readable storage medium for execution by at least one of the one or more processors. The program instructions comprising: program instructions to obtain a unique sequence value from a unique sequence range of known maximum number of values; program instructions to determine a first product by multiplying a value included in a primary range and a maximum number of values in a secondary range; program instructions to generate a first total by adding the first product to a value included in the secondary range; program instructions to determine an offset value by multiplying the first total by the maximum number of values in the unique sequence range; program instructions to generate an identifier value for a database by adding the offset value to a unique sequence value; and program instructions to process a transaction of a plurality of transactions by using the identifier value as a database primary key in a database of a transaction processing system.

According to a third aspect of the present invention there is provided a computer program product for processing a transaction, the computer program product comprising: one or more computer-readable storage media and program instructions stored on the one or more computer-readable storage media. The program instructions comprising: program instructions to obtain a unique sequence value from a unique sequence range of known maximum number of values; program instructions to determine a first product by multiplying a value included in a primary range and a maximum number of values in a secondary range; program instructions to generate a first total by adding the first product to a value included in the secondary range; program instructions to determine an offset value by multiplying the first total by the maximum number of values in the unique sequence range; program instructions to generate an identifier value for a database by adding the offset value to a unique sequence value; and program instructions to process a transaction of a plurality of transactions by using the identifier value as a database primary key in a database of a transaction processing system.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1:
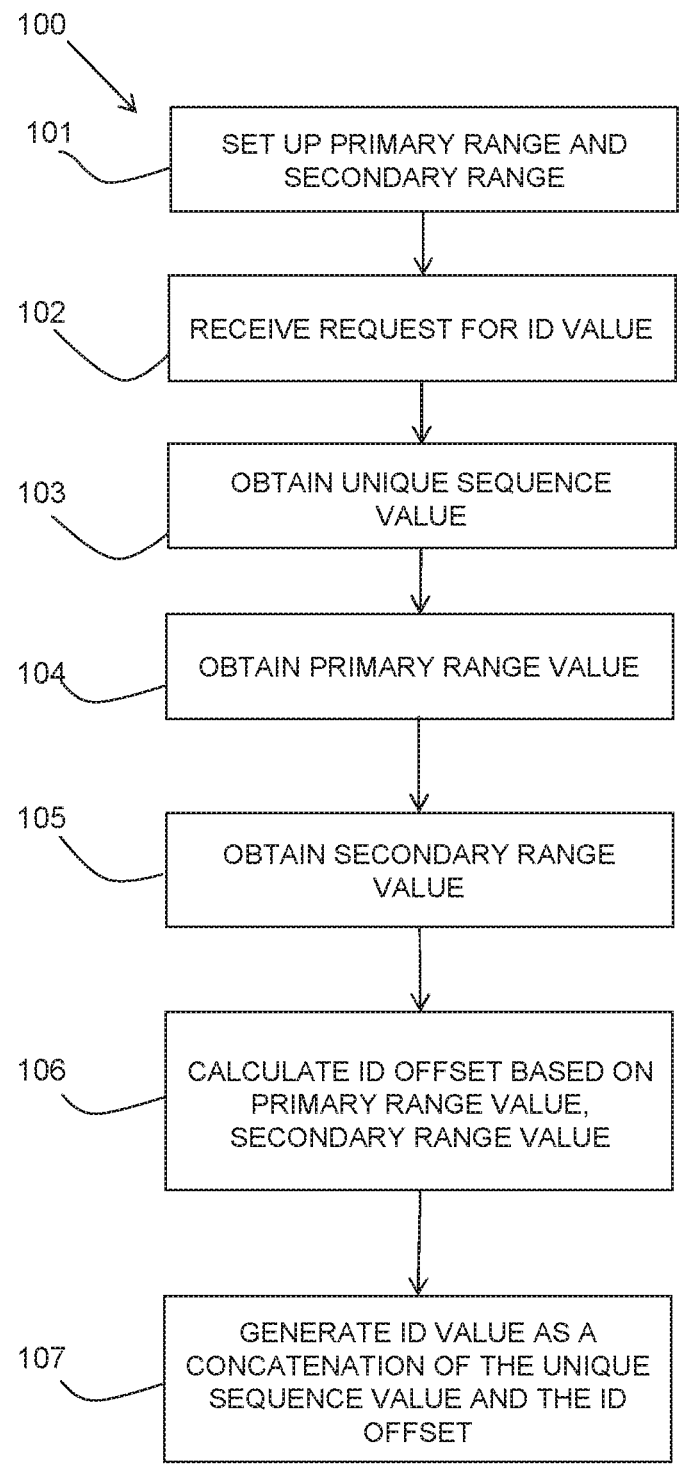
FIG. 1 is a flow diagram of an embodiment of a method in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of the present invention recognize introducing a second sequence to allow allocation of ID sub-sets in increments of 100 to improve high frequency transaction throughput. Embodiments of the present invention recognize that can result in repeated Open Database Connectivity (ODBC) interaction to allocated IDs, especially for the singular increment sequence. Embodiments of the present invention recognize that this can result in the sequential generation of IDs, which can be a contention point when scaling transaction processing as it limits vertical and horizontal scalability. Embodiments of the present invention further recognize that this can require the maintenance of two sequences over mutually exclusive ranges.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for utilization based range distributed cache ID generation in high transaction rate systems. Embodiments of the present invention provide creation of unique ID values that can be used as database primary keys in high volume transaction systems.

Embodiments of the present invention recognize the use of sequential IDs distributed across a whole database. Some embodiments of the present invention provide non-sequential ID allocation targeted at specific parts of the database, for example, by matching ID values to a partitioned database.

Some embodiments of the present invention provide a numbering scheme that, when applied, provides performance increasing characteristics, in particular in the use of a distributed database.

Some embodiments of the present invention provide a range distribution feature, which is a mechanism for allocation of a secondary range, based on dynamic behavior, to facilitate the distribution of workload across partitions.

Some embodiments of the present invention recognize the advantages of a scheme of creating IDs that are aligned to a partitioning strategy. Some embodiments of the present invention recognize the advantages of an ID generation scheme that are is aligned to a partitioning strategy.

Some embodiments of the present invention recognize that when ID generation is used in conjunction with a matching strategy of database table partitioning (by ID range), it possible for separate runtime instances in a horizontally scaled environment to target their own sets of database partitions.

Some embodiments of the present invention provide a matching strategy of database table partitioning that involves the setup of the database so specific tables are split between multiple partitions, where a range of ID values is configured for each partition, and rows stored in the table are assigned to a partition based the value of their primary key. In some embodiments of the present invention, the ID value ranges may be determined by the set of possible ID values for specific primary and secondary range values. Therefore, different partitions will align with ID values based on different combinations of primary and/or secondary range values.

Some embodiments of the present invention provide independent concurrent activities within a single runtime instance to target separate database partitions. This can result in increased performance when scaling due to a reduction in database contention. In addition, independent concurrent activities affect different areas of the database indices, which can also reduce database contention.

Some embodiments of the present invention provide a method of generating a secondary range value. Some embodiments of the present invention use such a method to increase performance of a highly scaled transaction processing system.

The terms primary and secondary ranges are used herein to facilitate understanding. Further, such usage herein facilitates understanding of methods that include descriptions of how such primary and secondary ranges are used. For example, in some embodiments, a method is provided wherein the use of separate primary and secondary ranges provides a high degree of control that may be customized to different circumstances. In one embodiment, one or both of the primary range and secondary range may be equivalent to one or both of instance and partition ranges.

In some embodiments and scenarios, one or more of the following processes may be utilized:

The primary range may be used to identify a database instance to avoid conflicts when contents of several database instances are merged in a single warehouse. A secondary range may be used to manage partitions on the instance.

A primary range may be used to identify a client of a shared database in a distributed environment. Both primary and secondary ranges may be used to manage partitions in a manner where separate sets of partitions are allocated per client.

Values may also be based on business content. For example, a customer could manage the primary ID allocation based on a business week or a business month.

A combination of these factors may be used.

Referring to FIG. 1, a flow diagram 100 shows an embodiment of the described method for creating unique ID values to be used as database primary keys in high volume transaction systems.

A user set-up 101 may be carried out to define a primary range and a secondary range. The primary range may have a maximum number of values which may map, for example, to the number of database instances. This may be set based on user requirements. A secondary range may have a maximum number of values in the secondary range. The secondary range may also be set based on user requirements. The maximum number of values in the secondary range may map to a number of partitions or other distribution across the database. Relating to the database table partitioning or distributed structure enables separate runtime instances in a horizontally scaled environment to target their own sets of database partitions or other form of distribution.

A new request for an ID value may be received 102.

A unique sequence value may be obtained 103. This may be obtained using a basic ID generation and cache algorithm as described further below. The maximum number of values in the unique sequence range is known.

If a new ID offset is required, a primary range value is obtained 104 from a primary range. The primary range value obtained 104 will be, for example, the instance number for this database instance.

If a new ID offset is required, a secondary range value may be obtained 105 from a secondary range.

A new ID offset may be calculated 106 from the primary range value and the secondary range value. This may be calculated in various ways. Further details, of a possible form of the calculation are provided below in relation to FIG. 2 which uses a secondary range maximum number of values, and a maximum number of values in the unique sequence range. In an alternative embodiment, the primary range value, secondary range value and number of primary and secondary range bits are used for the offset calculation as described further below.

An ID value is then generated 107 as a concatenation of the unique sequence value obtained at step 101 and the calculated ID offset from step 106 or an existing ID offset.

Figure 2:
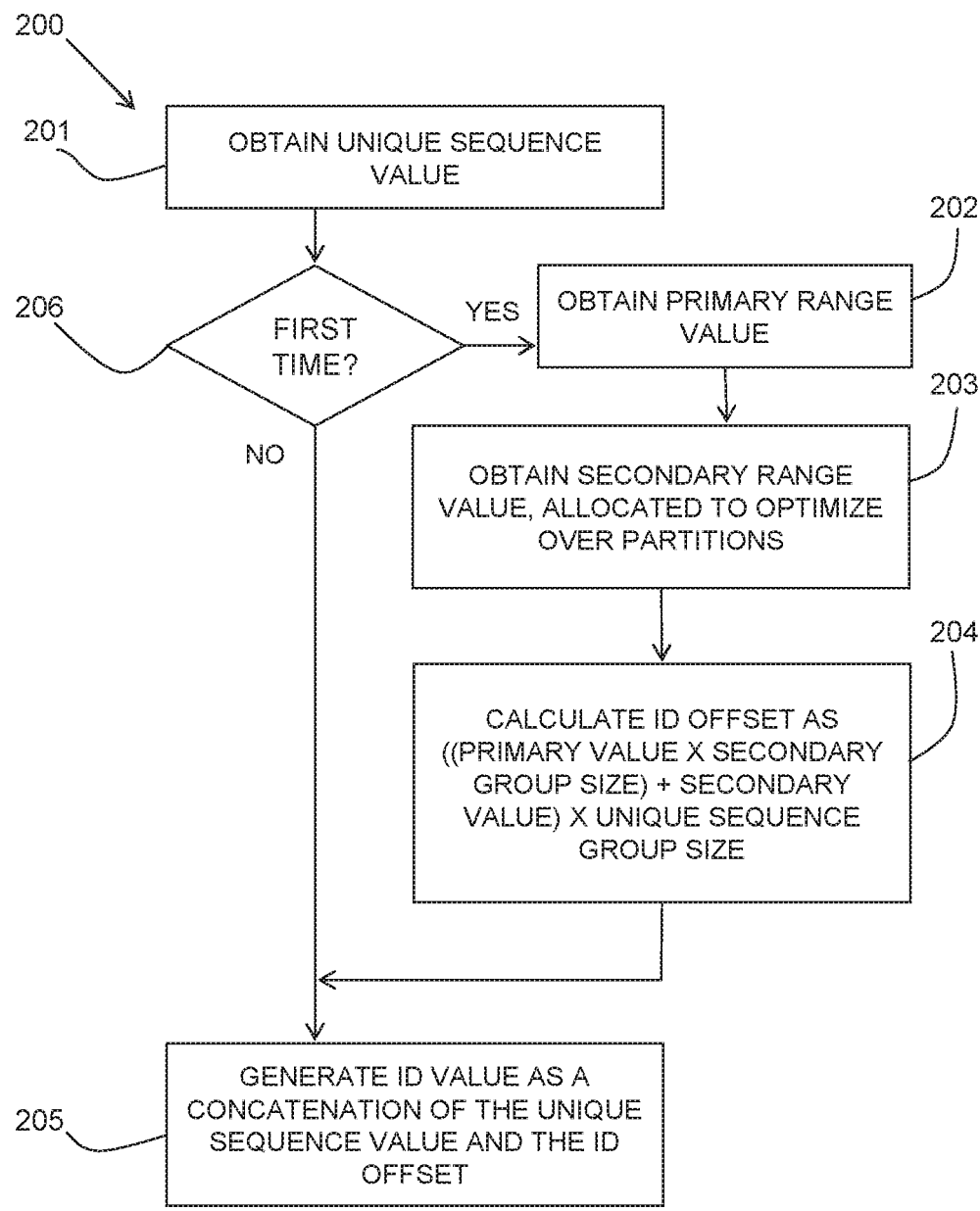
FIG. 2 is a flow diagram of an example embodiment of a method in accordance with an embodiment of the present invention.

Referring to FIG. 2, a flow diagram 200 shows an embodiment of the described method.

A unique sequence value is obtained 201 as in FIG. 1. It may then be determined 206 if this is the first time an ID offset is required for an individual activity (for example, a transaction in a transaction processing system). If it is the first time, then the range values must be obtained to produce a new ID offset.

If it is the first time, a primary range value is obtained 202 as in step 104 of FIG. 1 and a secondary range value is obtained 203 as in step 105 of FIG. 1.

The ID offset is calculated 204 in this embodiment using the following equation: ID offset=((primary range value× maximum number of secondary range values)+secondary range value)×maximum number of values in the unique sequence range.

At a next step 205, the ID value is generated as a concatenation of the unique sequence value and the calculated ID offset.

If it is determined 206 that it is not the first time, the method proceeds straight to step 205 in which the ID value is generated as a concatenation of the unique sequence value and the calculated ID offset.

The formula shown at step 204 of FIG. 2 provides a flexible implementation, whereby the ranges can be flexibly defined such that the user may choose the maximum number of values for each range and whether the values in the primary and secondary range should be aligned to specific digits (binary, decimal, or other number base), or not aligned to specific digits, in the resulting ID values.

For an alternative simpler implementation, parameter values could just specify the number of binary digits (bits) for the primary range, and the number of binary digits (bits) for the secondary range.

Then the formula to calculate ID offset (for an 8 byte ID value) would become: ID Offset=(primary range value bit_shift_left (63−number of primary range bits)) bit_OR (secondary range value bit_shift_left (63−number of primary range bits−number of secondary range bits)).

In this formula the bit_OR operator could also be substituted with the plus operator.

The parameter values for the number of primary range bits and the number of secondary range bits could be configurable, or fixed for a specific implementation.

It is proposed that the ID value generation can be split into two parts:
Sequential Generation & Caching of unique IDs; and
Manipulation of ID to include a customer specific primary/secondary (instance/partition) key.
Sequential Generation & Caching of Unique Ids This allows the basic ID generation and cache algorithm to be standardized and to standardize the customization point while still giving customers the flexibility to use some of the ID range for instance/partitioning if they wish.

The size of the sequence increment is configurable and the cache is aware of the increment step. This allows the cache to dynamically allocate IDs from within the range of the increment.

Typically, a database sequence will be used to provide sequence values for a cache algorithm to be used as part of the ID. The database will be configured to increment the sequence by a reasonably large value, say 1000.

A process that is following this system will request sequence values (single or group) from the cache algorithm, which will try to satisfy the request from values stored in the cache. If the request cannot be satisfied from the cache, the cache algorithm would request the next value from the database sequence. The process will be aware of the increment value and can claim that number of sequential values starting with the returned value, adding these values to a cache.

For example, the process retrieves the sequence value 10000, which means it can then use values from 10000-10999 as and when it needs them, i.e., this set of values is added to a cache. The next process to retrieve a value from the sequence will get 11000.

Manipulation of the ID retrieved from the cache is done by a replaceable function such that a customer can implement and plugin an alternate adjustment algorithm if required.

Manipulation of ID to Include a Customer Specific Primary/Secondary Key

For this example, it is assumed that the ID value is represented by a signed 8 byte integer value, i.e. 64 bits, a type that would typically be used for a database primary key.

To avoid confusion, the most significant bit is not used since this forms the sign part of the number (if this bit is set the number is negative).

Therefore, there are 63 useable bits (0-62) and a useable range of approximately $2^{63}$.

Figure 3A:
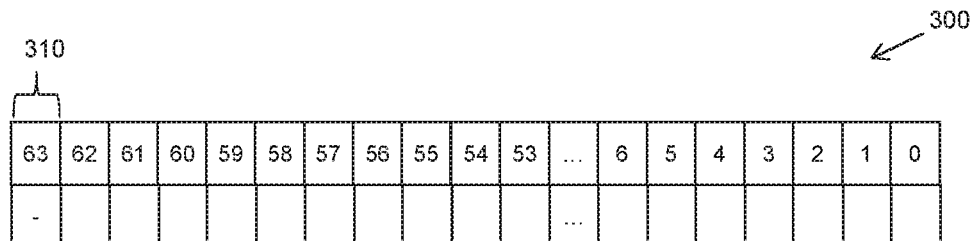
FIGS. 3A to 3D show schematic representations of components of ID values in accordance with an embodiment of the present invention.

Referring to FIG. 3A-3D, an ID value 300 is shown with various numbers/bits being indicated using brackets. The status of such bits is, for example, reserved, not-to-be used, un-usable, or remaining. In FIG. 3A, ID value 300 is shown with the first bit 310 un-useable as indicated using a dash mark under bit number 63.

The following sections illustrate how three separate components, namely the primary range, secondary range, and unique sequence value are combined to produce a single value in this usable range.

For this example, the separate components are aligned to binary digits (bits). The components may also be aligned to decimal digits, or not aligned to any number base.
Primary Range For this example, primary range values are used to identify the database instance to avoid conflicts when contents of several database instances are merged in a single warehouse.

Some part of the application code is able to determine a number to represent the instance. This number is included as the primary range component of the ID value 300.

Figure 3B:
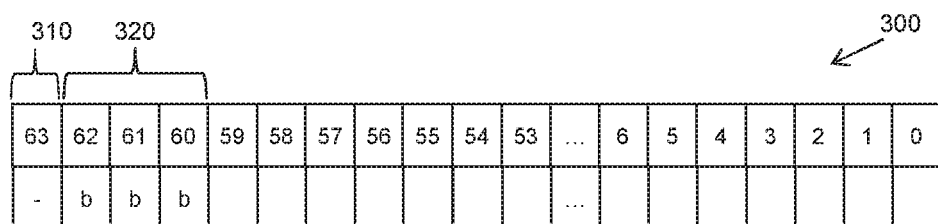
Figure 3C:
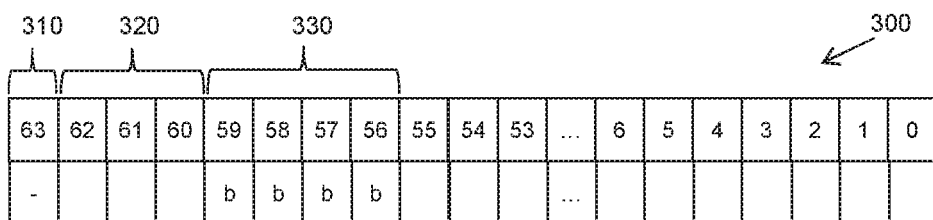

If we assume, 4 instances are required, this means 2 bits of the ID value are required to support that. A customer may wish to include some contingency for future instances, so 3 bits may be reserved 320 as shown in FIG. 3B which would support 8 instances, as indicated using a "b" mark under numbers 60-62.
Secondary Range The secondary range provides a means to produce non-sequential ID values.

Typically, independent concurrent activities will use different values for the secondary range. The secondary range values will typically be used to define the ID value ranges for separate database partitions.

Some part of the application code will be able to determine a number for the secondary range. The default implementation to be used is that activities within a group of activities allocated to a secondary range value on round robin basis of least used secondary range values.

Each activity unit (thread, transaction, etc.) at the start of the unit of work grabs the next most suitable secondary range value for use with its inserts. The suitability should be determined by the number of activity units within a group of activity units. The ID's may allocate round robin with 2 threads allowed to use the same value. Tracking of usage is done so that concurrent activity units within a group try to avoid, where possible, concurrent use of the same value (and thereby target different partitions).

If it is assumed 16 partitions are required, that would require 4 bits. A customer may be more certain that they will not want to use 32 partitions in future so a contingency is not added for this. These bits are shown at 330 in FIG. 3C, as indicated using a "b" mark under numbers 56-59.

Unique Sequence Value

This then leaves 56 bits for a unique sequence value: $(2^{55}-1)=36,028,797,018,963,967$. This ensures that the resulting ID values are unique. In simple terms, that is 36 quadrillion (US) or 36,000 billion (EU).

Figure 3D:
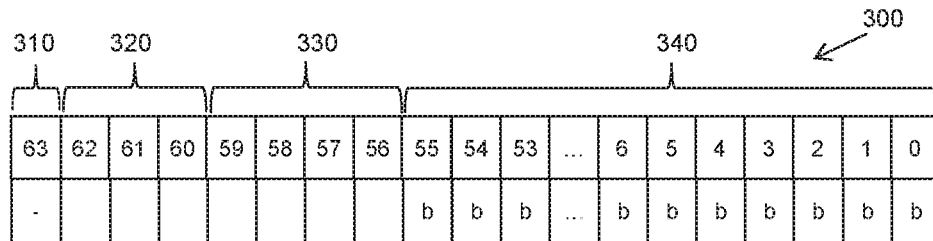

FIG. 3D shows the remaining bits 340, as indicated using a "b" mark under numbers 0-55.

There is a balance to be struck here between #instances, #partitions and the supported ID range.

In one embodiment, a fixed number of bits may be reserved for each range (primary and secondary) and sizes would be a factor of 2 (e.g. 2, 4, 8, 16 etc.).

In another embodiment, this may be more flexible and decimal values may be allowed for the range sizes (e.g., 5, 10 etc.). This approach does not remove the option of the original binary approach outlined above.

ID Offset Value

The ID offset is a value calculated from the primary range value and secondary range value such that the ID offset can be added to a unique sequence value to produce an ID value, with each of the component values correctly encoded.

To calculate the ID offset to apply to the raw sequence number, the following formula can be used:

$$((PrimaryIdGrpNum*SecondaryIdGrpSize)+SecondaryIdGrpNum)*SequenceMax$$
$$SequenceMax=2^{63}/(PrimaryIdGrpSize*SecondaryIdGrpSize)$$

Round down to nearest $2^n$ or $10^n$, whichever is preferred.

Decimal Range Example

A decimal ranged example is provided as follows:

10 instances 20 partitions

= 200 *ID* regions

= 46116860184273879 round down ...

*SequenceMax* = 46000000000000000 or

*SequenceMax* = 40000000000000000

Binary Range Example

A binary ranged example (equivalent to the original binary approach) is provided as follows:

8 instances
32 partitions
=256 total ID regions
No rounding down since we are choosing to make full use of the ID range $SequenceMax=36028797018963968=2^{55}=0x80000000000000$ Configuring Instance & Partition Implementation An implementation may introduce a new table in the database to hold instance wide settings.

Create table XXX_CONFIG
   column NAME varchar(100)
   column VALUE varchar(30000)

It is proposed this table would hold the following configuration parameters:

IdSeqIncrement—Allow the cache implementation to know how many IDs are made available with each database sequence value retrieved.

PrimaryIdGrpSize—Maximum number of values in primary range. In the context of the example in this document this will map to the number of database instances.

PrimaryIdGrpNum—Value to use for primary range. In the context of the example in this document this will be the instance number for this database instance.

SecondaryIdGrpSize—Maximum number of values in secondary range. In the context of the example in this document this will map to the number of partitions.

UniqueSeqGrpSize—Maximum number of values in unique sequence range.

A typical implementation would allow the parameter PrimaryGrpNum to be separately configured for each instance.

Figure 4A:
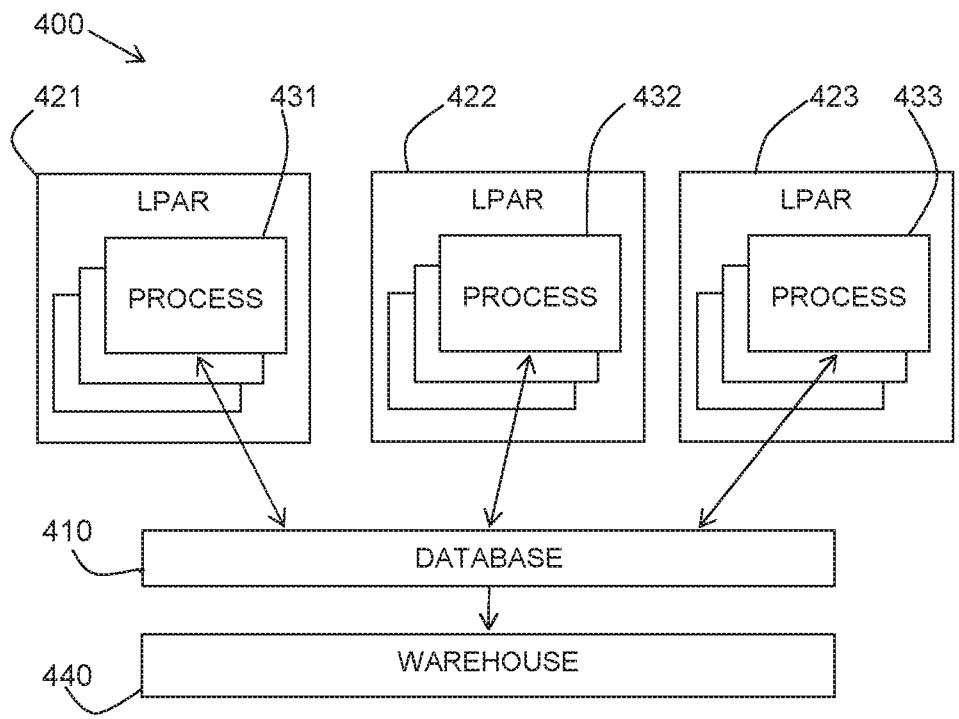
FIGS. 4A and 4B are block diagrams of examples of systems in accordance with an embodiment of the present invention.

Referring to FIG. 4A, a block diagram shows an example embodiment of a database system 400. A database 410 with an associated warehouse 440 may be accessed by multiple systems or logical partitions of a virtual system 421, 422, 423 each of which may run multiple transaction processes 431, 432, 433. Using the described method, non-sequential IDs may be targeted at specific parts of the database 410.

Figure 4B:
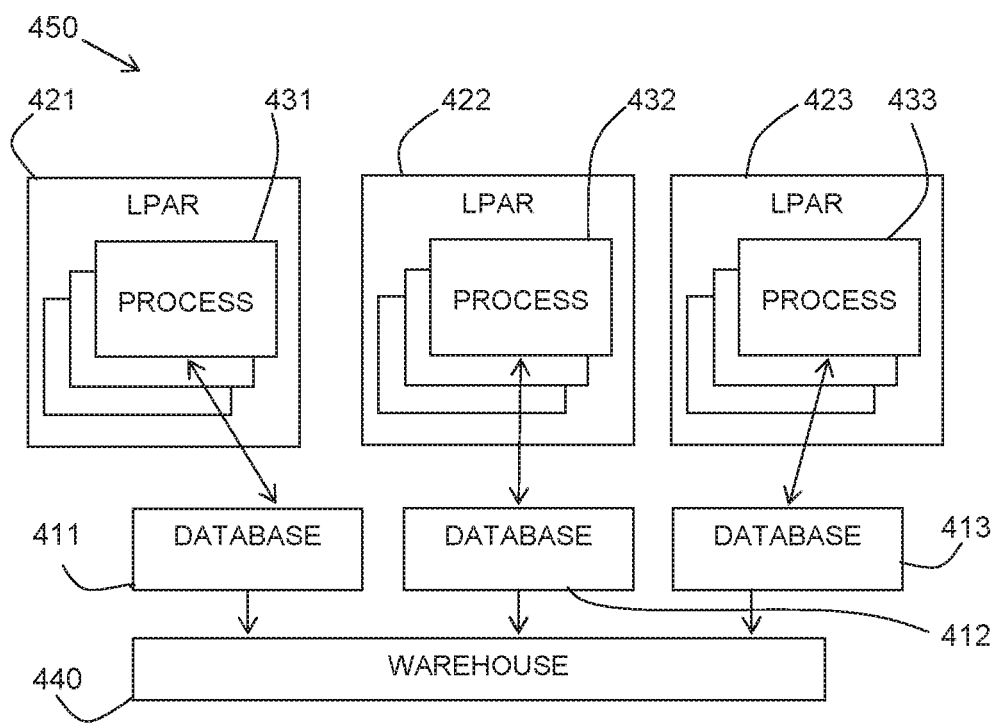

Referring to FIG. 4B, a block diagram shows another example embodiment of a database system 450. Multiple databases 411-413 are shown with an associated warehouse 440. Each database 411-413 may be accessed by separate systems or logical partitions of a virtual system 421, 422, 423 each of which may run multiple transaction processes 431, 432, 433. Using the described method, non-sequential IDs may be targeted at specific parts of the databases 411-414.

Figure 5:
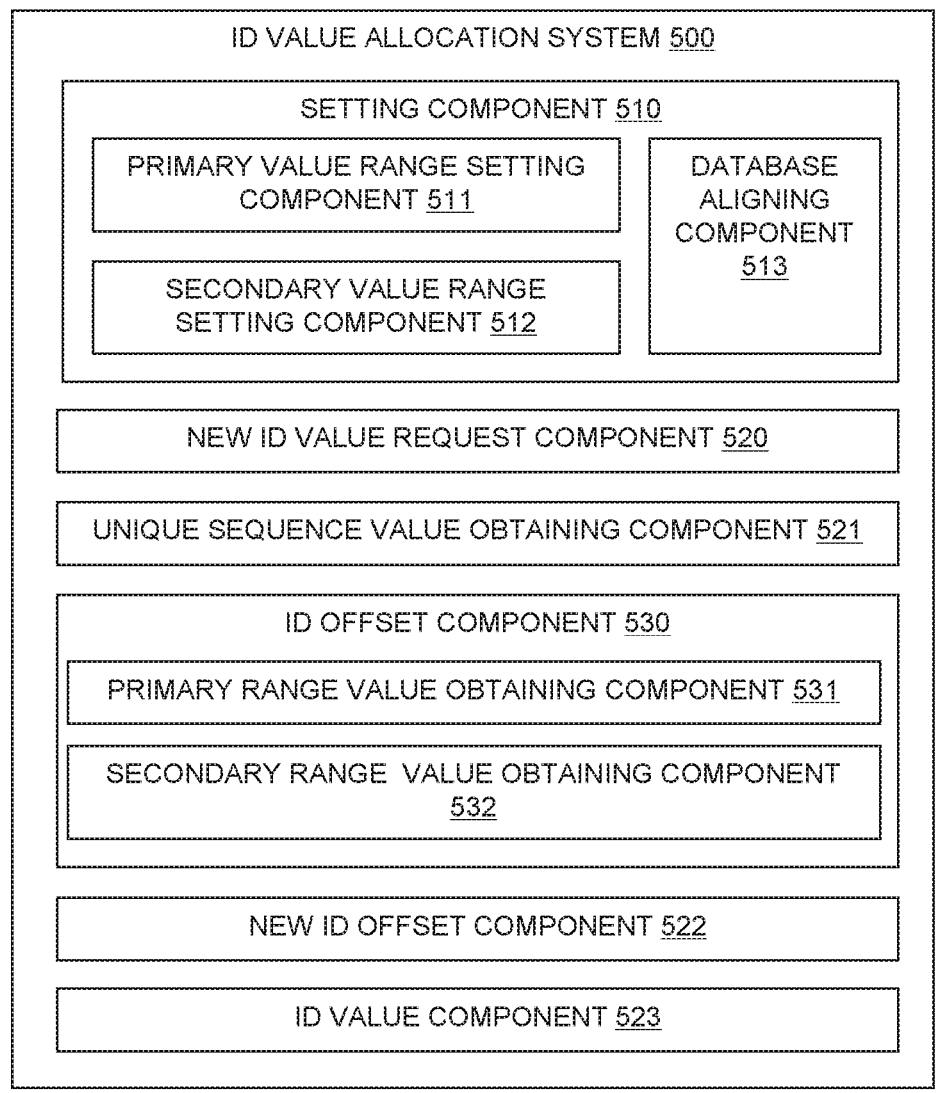
FIG. 5 is block diagram of an embodiment of a system in accordance with an embodiment of the present invention.

Referring to FIG. 5, a block diagram shows an example embodiment of an ID value allocation system 500 using the described method.

The ID value allocation system 500 may include a setting component 510 including a primary value range setting component 511 including setting a primary range maximum size and a secondary value range setting component 512 including setting a secondary range maximum size. The setting component 510 may include a database aligning component 513 for aligning the primary range and/or the secondary range to a partitioned database.

The ID value allocation system 500 may include a new ID value request component 520 for receiving a request for a new ID value.

The ID value allocation system 500 may include a unique sequence value obtaining component 521 for obtaining a unique sequence value.

An ID offset component 530 may be provided for calculating the ID offset for given primary range and secondary range values. The ID offset component 530 may include a primary range value obtaining component 531 and a secondary range value obtaining component 532.

A new ID offset component 522 may be provided for determining if a new ID offset is to be calculated for an ID value request.

An ID value component 523 may be provided to concatenate the unique sequence value and the ID offset and output the ID value.

The described approach addresses various problems. In particular, it reduces ODBC overheads.

It also provides an efficient mechanism to allocate a set of multiple ID values. In known financial transaction management systems, a second sequence is known to be introduced to allow allocation of ID sub-sets in increments of 100 to improve high frequency transaction throughput. In the prior art, one database sequence (that incremented by steps of 1) is used to allocate single ID values, and a separate database sequence is used (that incremented by steps of 100) when a larger number of ID values are required at the same time.

The described mechanism supports non-sequential ID allocation while retaining uniqueness. This reduces contention on tables and indexes in the database at high transaction rates.

The described mechanism provides support to generate a unique ID for all objects across one or more database instances. This would avoid conflicts in operational data store and warehouse databases.

The described mechanism also supports a flexible partitioning strategy.

Figure 6:
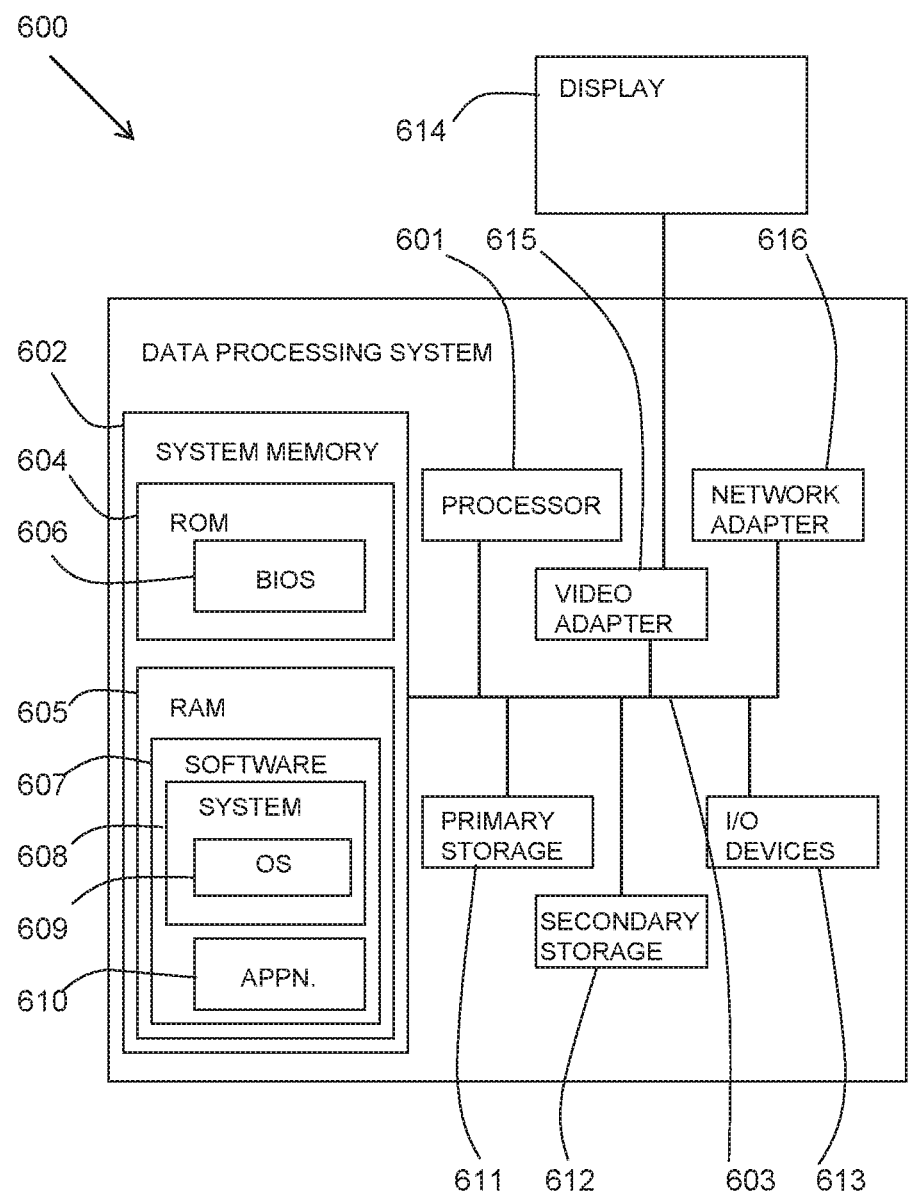
FIG. 6 is a block diagram of an embodiment of a computer system in which an embodiment of present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608 such as operating system software 609. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

In some embodiments, the present invention is embodied as an integrated circuit chip that is configured for identifier generation in transaction processing systems.

Having described the preferred embodiment for identifier generation in transaction processing systems devices/structures (which are intended to be illustrative and not limiting), it is noted that modifications and variations may be made by persons skilled in the art in light of the above teachings.

The resulting integrated circuit chips (that incorporate identifier generation in transaction processing systems) can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

The invention claimed is:

1. A method for processing a transaction, comprising:
 obtaining, by one or more computer processors, a unique sequence value from a unique sequence range of known maximum number of values;
 determining, by the one or more computer processors, a first product by multiplying a value included in a primary range and a maximum number of values in a secondary range;
 generating, by the one or more computer processors, a first total by adding the first product to a value included in the secondary range;
 determining, by the one or more computer processors, an offset value by multiplying the first total by the maximum number of values in the unique sequence range;

generating, by the one or more computer processors, an identifier value for a database by adding the offset value to a unique sequence value; and processing, by the one or more computer processors, a transaction of a plurality of transactions by using the identifier value as a database primary key in a database of a transaction processing system.

2. The method as claimed in claim 1, the method comprising:

receiving, by the one or more computer processors, a new identifier value request; and determining whether a new offset value is required.

3. The method of claim 1, wherein the unique sequence value is selected from a unique sequence range of known maximum number of values.

4. The method of claim 1, the method comprising:

initiating generation of an identifier for the transaction, by the one or more computer processors, based, at least in part, on definitions of both a primary range and a secondary range, wherein one or both of the primary range and the secondary range are aligned to a partitioned database.

5. The method claim 4, wherein the primary range defines a range of database instances, and the secondary range defines a range of database partitions.

6. The method of claim 4, wherein the primary range defines a range of client identifiers, and the secondary range defines a range of database partitions allocated per client.

7. The method of claim 4, wherein the primary range and the secondary range in combination define a range of database partitions.

8. The method of claim 4, wherein the primary range defines a range of values based on business content, and the secondary range defines a range of database partitions.

9. The method as claimed in claim 1, wherein the primary range and the secondary range are defined, at least in part, based on a number of bits used to represent binary digits included in the primary range and a number of bits used to represent binary digits included in the secondary range.

10. A computer program product for identifier generation in transaction processing systems, the computer program product comprising:

one or more computer-readable storage media and program instructions stored on the one or more computer-readable storage media, the program instructions comprising:

program instructions to obtain a unique sequence value from a unique sequence range of known maximum number of values;

program instructions to determine a first product by multiplying a value included in a primary range and a maximum number of values in a secondary range;

program instructions to generate a first total by adding the first product to a value included in the secondary range;

program instructions to determine an offset value by multiplying the first total by the maximum number of values in the unique sequence range;

program instructions to generate an identifier value for a database by adding the offset value to a unique sequence value; and program instructions to process a transaction of a plurality of transactions by using the identifier value as a database primary key in a database of a transaction processing system.

11. The computer program product of claim 10, including:

program instructions to receive a new identifier value request; and program instructions to determine whether a new offset value is required.

12. The computer program product of claim 10, wherein the unique sequence value is selected from a unique sequence range of known maximum number of values.

13. The computer program product of claim 10, the program instructions comprising:

program instructions to initiate generation of an identifier for the transaction based, at least in part, on definitions of both a primary range and a secondary range, wherein one or both of the primary range and the secondary range are aligned to a partitioned database.

14. The computer program product of claim 13, wherein the primary range defines a range of database instances, and the secondary range defines a range of database partitions.

15. The computer program product of claim 13, wherein the primary range defines a range of client identifiers, and the secondary range defines a range of database partitions allocated per client.

16. The computer program product of claim 13, wherein the primary range and the secondary range in combination define a range of database partitions.

17. The computer program product of claim 13, wherein the primary range defines a range of values based on business content, and the secondary range defines a range of database partitions.

18. The computer program product of claim 10, wherein the primary range and the secondary range are defined, at least in part, based on a number of bits used to represent binary digits included in the primary range and a number of bits used to represent binary digits included in the secondary range.

19. A computer system for processing a transaction, comprising:

one or more computer processors;

one or more computer readable storage medium; and program instructions stored on the computer readable storage medium for execution by at least one of the one or more processors, the program instructions comprising:

program instructions to obtain a unique sequence value from a unique sequence range of known maximum number of values;

program instructions to determine a first product by multiplying a value included in a primary range and a maximum number of values in a secondary range;

program instructions to generate a first total by adding the first product to a value included in the secondary range;

program instructions to determine an offset value by multiplying the first total by the maximum number of values in the unique sequence range;

program instructions to generate an identifier value for a database by adding the offset value to a unique sequence value; and program instructions to process a transaction of a plurality of transactions by using the identifier value as a database primary key in a database of a transaction processing system.

20. The computer system of claim 19, the program instructions comprising:

program instructions to initiate generation of an identifier for the transaction based, at least in part, on definitions of both a primary range and a secondary range, wherein one or both of the primary range and the secondary range are aligned to a partitioned database.

\* \* \* \* \*